US007049572B2

(12) United States Patent
Jespersen et al.

(10) Patent No.: US 7,049,572 B2
(45) Date of Patent: May 23, 2006

(54) OPTICAL SENSOR AND METHOD OF OPERATION THEREOF

(75) Inventors: Gunnar Jespersen, Aberdeen (GB); Eric G. Lyons, Dundee (GB)

(73) Assignee: NCR Corporation, Dayton, OH (US)

( * ) Notice: Subject to any disclaimer, the term of this patent is extended or adjusted under 35 U.S.C. 154(b) by 24 days.

(21) Appl. No.: 10/922,525

(22) Filed: Aug. 20, 2004

(65) Prior Publication Data

US 2005/0040315 A1 Feb. 24, 2005

(30) Foreign Application Priority Data

Aug. 23, 2003 (GB) ................................ 0319884.3

(51) Int. Cl.
*G01J 1/32* (2006.01)
*G01N 21/86* (2006.01)

(52) U.S. Cl. .............. 250/205; 250/559.27; 250/223 R

(58) Field of Classification Search ................ 250/205, 250/559.27, 559.28, 559.4, 223 R; 356/614, 356/630

See application file for complete search history.

(56) References Cited

U.S. PATENT DOCUMENTS

| | | | |
|---|---|---|---|
| 4,384,194 | A | 5/1983 | Jones |
| 4,529,318 | A | 7/1985 | Curl |
| 4,737,627 | A | 4/1988 | Hughes et al. |
| 5,280,333 | A | 1/1994 | Gao |
| 5,805,292 | A | 9/1998 | Fournier et al. |

FOREIGN PATENT DOCUMENTS

| | | | | |
|---|---|---|---|---|
| EP | 0 921 083 | A2 | | 6/1999 |
| EP | 1120753 | A3 | | 8/2001 |
| EP | 1302910 | A3 | | 4/2003 |
| GB | 1226487 | A | | 3/1971 |
| JP | 09323846 | A | * | 12/1997 |
| JP | 2000-172897 | A | * | 6/2000 |

* cited by examiner

*Primary Examiner*—Kevin Pyo
(74) *Attorney, Agent, or Firm*—Michael Chan

(57) ABSTRACT

An optical detector is disclosed, which is adapted to measure the opacity of media. The detector comprises a light means and a light sensor, arranged so as to have a media path there between. The light source has a drive means, which is actively adjustable, during use, for detecting media of different opacities, so as to maintain a substantially constant sensor output.

7 Claims, 5 Drawing Sheets

OPTICAL SENSOR AND METHOD OF OPERATION THEREOF

BACKGROUND OF THE INVENTION

The present invention relates generally to an optical sensor and a method of operation thereof and in particular to a method of enhancing sensor accuracy.

Optical sensors are commonly used for a variety of functions including detecting skewed or double picked notes within the note transport mechanism of an Automated Teller Machine.

A variety of different prior art detectors have been utilized to detect note skew in ATMs. These include both electro-mechanical and optical detectors. However, they all have certain features in common. In particular, they all rely on a pair of sensors, each of which is located at a predetermined position along the transport path within the ATM. Also as the detector is arranged to determine skew perpendicular to the direction of travel along the transport path, both sensors and light sources must be located within the transport path, thus making assembly and serviceability of the detectors difficult. For example, cables must be laid into both sides of the transport path to connect to the sensors.

In addition, changes in LED power and sensor sensitivity throughout the lifetime of a sensor have also caused problems when attempting to use optical sensors for note detection in an ATM.

A further problem with the use of optical sensors is the large variation in the opacity of notes used today. Also, some bank notes have relatively transparent windows. With prior art optical sensors these windows are seen as holes.

SUMMARY OF THE INVENTION

It is an object of the present invention to provide an optical sensor that ameliorates the aforementioned problems.

It is a further object of the present invention to produce an improved note skew detector.

It is a still further object of the present invention to provide an optical sensor that can operate accurately while utilizing a relatively inexpensive phototransistor-as opposed to an expensive photo-diode.

According to a first aspect of the present invention there is provided an optical detector adapted to measure the opacity of media, comprising a light means and a light sensor, arranged so as to have a media path there between, the light source having a drive means which is actively adjustable, during use, for detecting media of different opacities, so as to maintain a substantially constant sensor output.

Preferably, the optical sensor is a single optical sensor.

Most preferably, the light source and optical sensor are optically coupled via two distinct optical paths, which are formed in part by optical light guides.

Preferably the detector comprises a control means arranged to make determinations as to the degree of skew of a note based on the signal produced from the sensor.

Preferably, when in use, the detector is arranged such that the sensor receives light via each optical path, the output of the sensor being dependent on whether or not a note is present in either or both optical paths.

According to a second aspect of the present invention there is provided an Automated Teller Machine (ATM) having an optical detector as described above.

According to a third aspect of the present invention there is provided a method of detecting the opacity of media utilizing a detector comprising a sensor, a light source and associated drive means arranged to provide a media path therebetween, the method comprising a) passing media therebetween,
b) adjusting the current to the light source in order to maintain the output of the sensor at a substantially constant level, and
c) measure the current required as a measure of opacity of the media being detected.

According to a fourth aspect of the present invention there is provided a method of detecting skew in a bank note, being transported along the transport path of a note transport mechanism, utilizing an optical detector comprising a light source and an optical sensor, which are optically coupled via light guides arranged to transmit light from the source to the sensor via two distinct optical paths, comprising detecting the actively adjustable input to the light source, required during use, for media of different opacities, so as to maintain a substantially constant sensor output an output at the sensor corresponding to both the first and second optical paths.

According to a fifth aspect of the present invention there is provided a method of detecting double picked bank notes in an ATM transport mechanism, utilizing an optical detector comprising a light source and an optical sensor, which are optically coupled via light guides arranged to transmit light from the source to the sensor via two distinct optical paths, comprising detecting the actively adjustable input to the light source, required during use, for media of different opacities, so as to maintain a substantially constant sensor output an output at the sensor corresponding to both the first and second optical paths.

BRIEF DESCRIPTION OF THE DRAWINGS

An embodiment of the present invention will now be described, by way of example, with reference to the accompanying drawings, in which.

DETAILED DESCRIPTION

Figure 1:
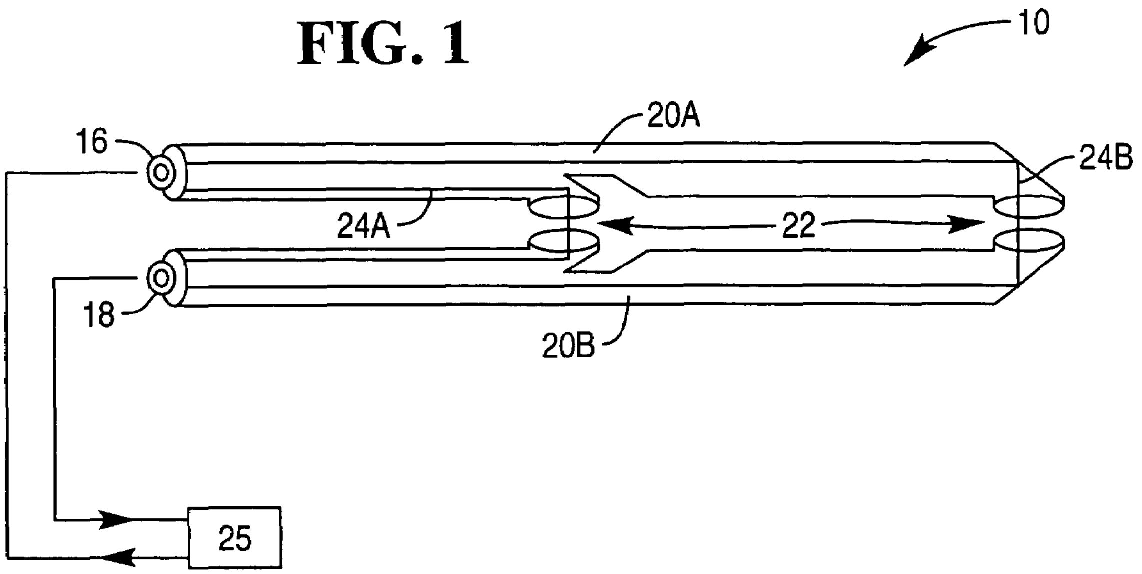
FIG. 1; is a schematic illustration of a note skew or double pick detector in accordance with the present invention.

FIG. 1 illustrates a skew note detector 10, including an optical sensing means 12, for use in a note transport mechanism 14 of an Automated teller Machine (ATM) (not shown). The detector 10 comprises a light source 16 and a single optical sensor 18, optically coupled via a pair of optical wave-guides 20A, 20B. The wave-guides are arranged to have an air gap 22 there between, so as to provide a note transport path between the said wave-guides. The wave-guides are further arranged to provide a first optical path 24A and a second, distinct, optical path 24B between the light source 16 and the sensor 18. In this way the output of the sensor 18 is dependent on the light transmitted via the wave-guides 20A, 20B to the detector 18, over both optical paths 24A, 24B. The output of the sensor 18 is fed to a control means 25 arranged to make determinations as to the degree of skew of a note based on the output of the sensor 18, as will be discussed in more detail below, with reference to FIGS. 2 & 3.

Figure 2:
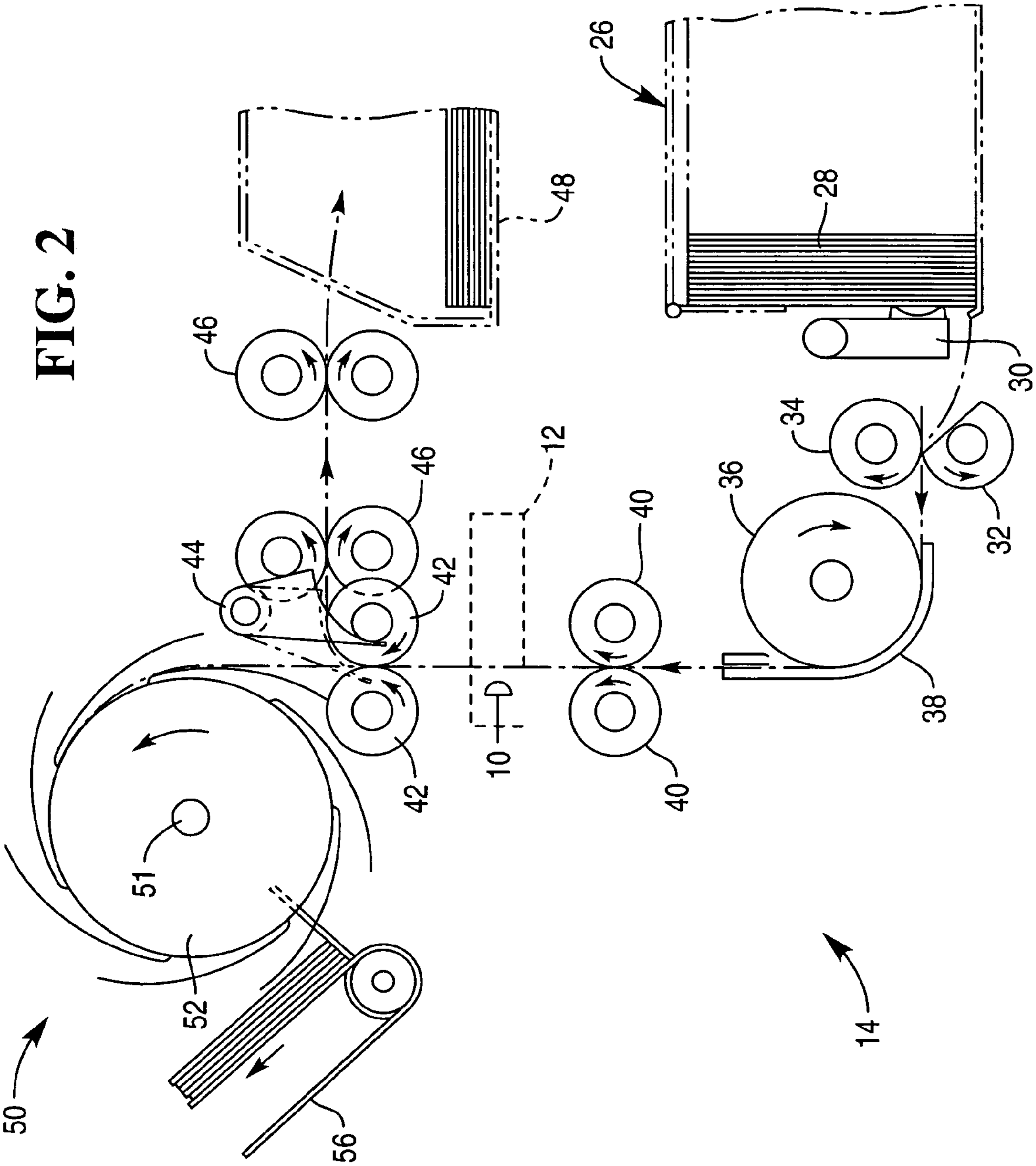
FIG. 2 is a schematic illustration of the detector of FIG. 1 in the transport mechanism of an Automated Teller Machine (ATM) in accordance with the present invention.

FIG. 2 illustrates the use of the detector 10 in the transport mechanism 14. In addition it illustrates the flexibility of the detector which, in addition to note skew detection can also provide information on double picked notes. The cash transport mechanism of FIG. 2 is part of an ATM cash dispensing mechanism, comprising a currency cassette 26 arranged to contain a stack of currency notes 28 of the same pre-determined denomination supported on their long edges. The cassette 26 is associated with a pick mechanism 30. When one or more currency notes are to be dispensed from the cassette 26 in the course of a cash dispensing operation, the pick mechanism 30 draws out notes one by one from the stack 28, and each note is fed by feed rollers 32,34,36 via guide means 38 to feed rollers 40. The direction of feed of the notes is at right angles to their long dimensions. It should be understood that the cash dispensing mechanism 14 could include more than one cassette each associated with a pick mechanism, but in the present embodiment only one cassette and pick mechanism will be described.

Each picked note is passed through the sensing station 12 by the feed rollers 40 and by further feed rollers 42. If a multiple note is detected by the optical system 10, in a manner to be described in more detail below, then a divert gate 44 diverts the multiple note via rollers 46 into a reject bin 48, in a manner known to a skilled person.

If a single note is detected then the note passes on to a stacking wheel 50 to be loaded on to stationary belt means 56. The stacking wheel 50 comprises a plurality of stacking plates 52 spaced apart in parallel relationship along the shaft 51 of the stacking wheel 50. When the required number of notes have been loaded on to the belt means 56, the belt means 56 transports the notes to a cash delivery slot (not shown), again in a manner known to a skilled person, which will not therefore be described further herein.

The detector 10 is positioned within the transport mechanism 14, such that the first and second wave-guides 20A, 20B lie on opposite sides of the transport path. Thus one or more bank notes being transported by the mechanism will pass through the air gap 22 between the wave-guides 20A, 20B. As the source 16 and sensor 18 are arranged at the same side of the transport path all necessary wiring can be located at the one side making assembly and repair considerably easier than in prior art detectors. Hence there is no need to feed wiring into the body of the transport mechanism, as with prior art skew and double pick detectors.

Figure 3:
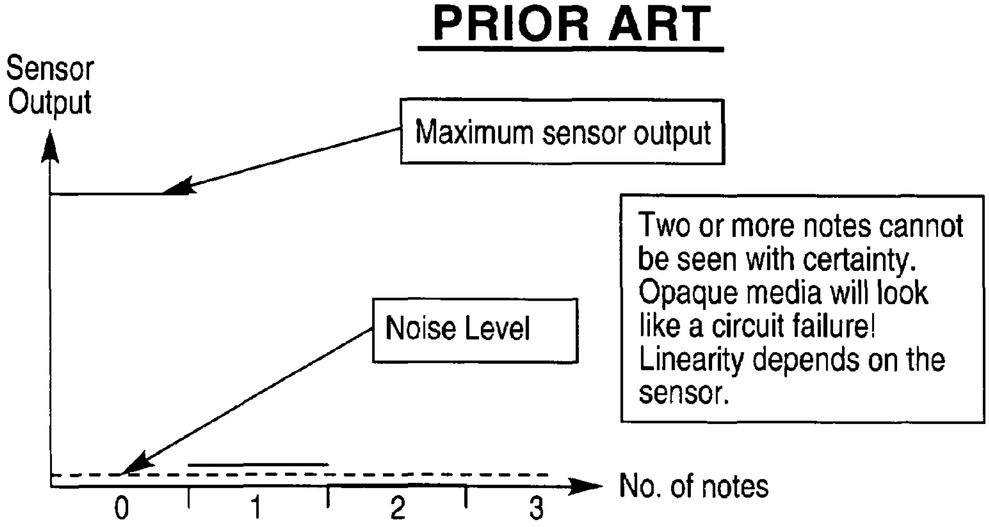
FIG. 3 PRIOR ART
FIG. 3 is a graphical representation of the variable output of a prior art detector, during the detection of a bank note.

FIG. 3 illustrates the output of a prior art non-compensated detector. To obtain maximum contrast between zero, one and two notes the light is set and fixed to an intensity that gives maximum sensor output with no notes present i.e. close to ground or supply. When a note is introduced the light reaching the sensor is reduced, generally from 100% to 5%. The output is now close to the signal noise level. By introducing a further note a similar (20 times) reduction will take place. Output is now 0.25% and cannot be easily discriminated from noise. Thus it can only be said that there is more than one note. Such a system will fail with more opaque media such as Thin Film media.

Also, changes in operation of the light sources or sensors used in such detectors during their lifetime can cause comparable changes in output from detectors leading to false readings.

Figure 4:
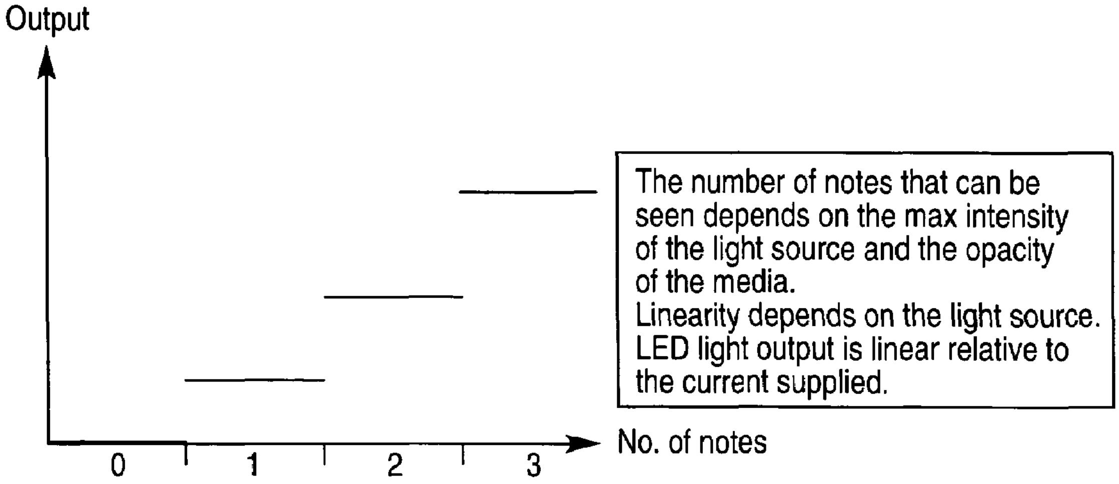
FIG. 4 is a graphical representation of the detector output produced to maintain a substantially constant sensor output when zero, one or more media pass through the detector.

FIG. 4 illustrates a detector output in accordance with the present invention in which the output of the sensor is maintained at a constant level by adjusting the supply voltage of the light source when one or more notes is detected.

When no notes are present the output of the detector is maintained at a fixed, low level, say 300 mV by applying a current of 0.12 mA to the light source within the detector. In order to maintain the same sensor output, when a note is placed in the optical path between the light source and the sensor, the current supplied to the light source must be raised, say to 8.0 mA. If a second, superposed note is located between the light source and sensor the input must be raised again, to say 30 mA, in order to maintain the same output from the sensor.

Thus the change in input from zero to one note is almost a 7-fold increase and the increase from one to two notes is more than 4-fold. Thus these increases are much more easily determined than with prior art methods. Thus measuring the input to the light source instead of the output from the sensor provides an improved detector.

With more powerful light sources these current levels would be greater and more linear, therefore, allowing the detection of extremely opaque media.

Figure 5:
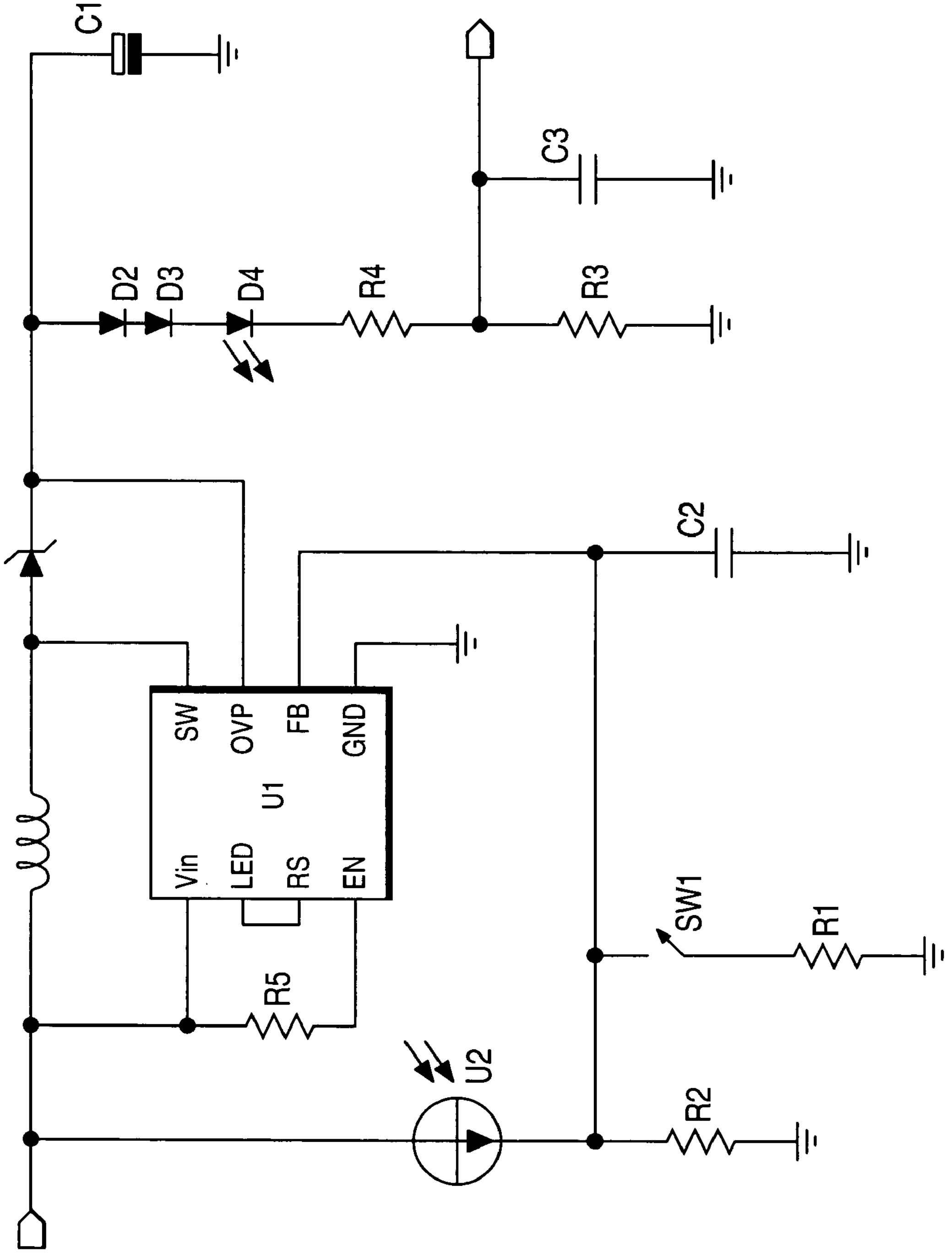
FIG. 5 is a schematic representation of the drive circuitry of a sensor in accordance with the present invention.
Figure 6A:
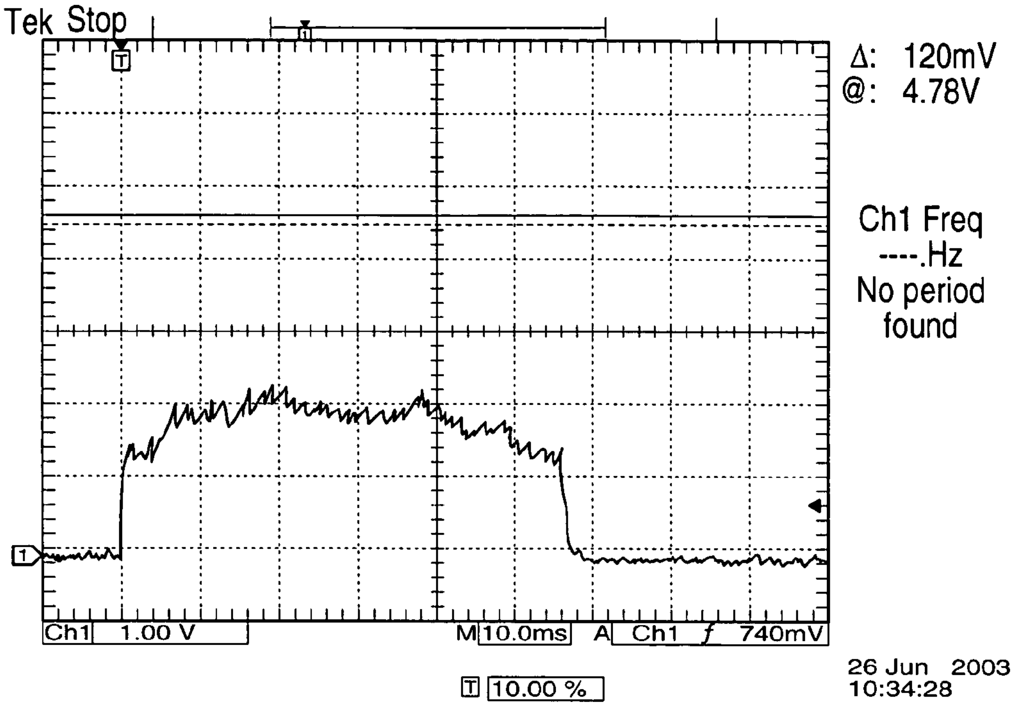
FIG. 6*a* is an illustration of the output of a sensor in accordance with the present invention when a single note is detected.
Figure 6B:
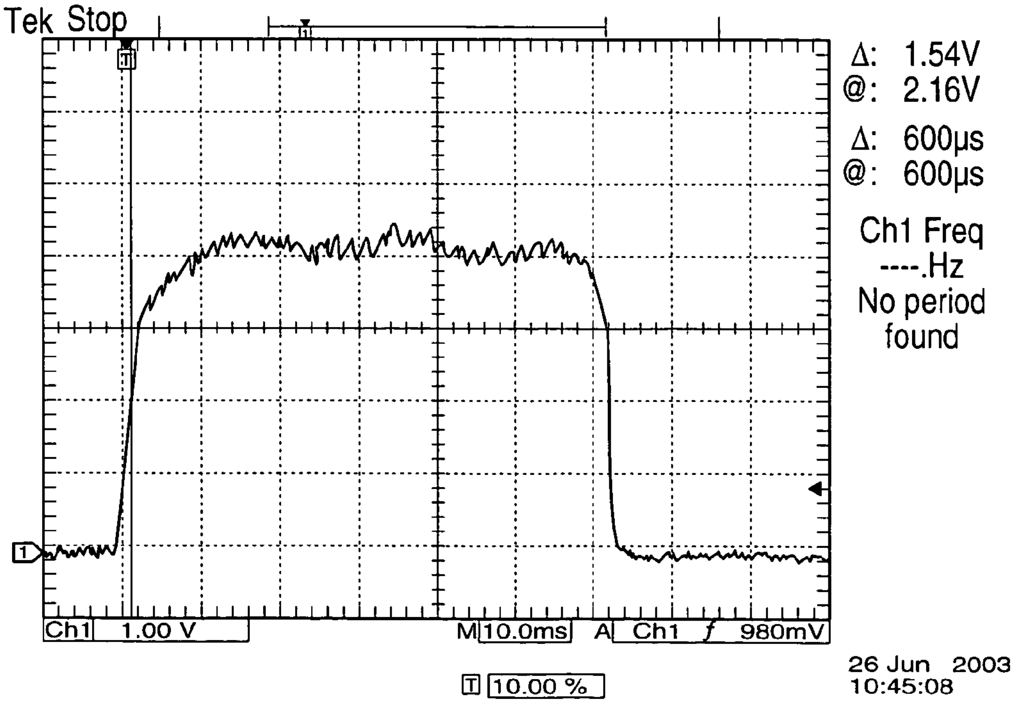
FIG. 6*b* is an illustration of the output of a sensor in accordance with the present invention when two notes are detected.

FIG. 5 illustrates the feedback circuit required to enable the maintenance of a constant sensor output, in the detector in accordance with the present invention.

The Compensated Opacity Schematics

The Loop Reaction Speed Depends On:

(1) The charge current delivered from the driver circuit to the charge capacitor
(2) The efficiency of the LED. Higher efficiency demands less current and thus speeds up the charge of the charge capacitor as well as it demands less change in a given situation and thus speeds up the loop reaction.
(3) The phototransistor load resistor. A smaller load resistor (greater load) depletes the base region of the phototransistor faster and allows for a faster turn off.
(4) The load of the charge capacitor. The smaller the two resistors R3 and R4 are the faster the charge capacitor can be depleted.
(5) The charge capacitor. A smaller capacitor is charged and depleted faster.
(6) The inductor. A larger inductor increases the drive current.

Closed Loop

The LED (D4) and the phototransistor (U2) are physically positioned such that U2 receives light from D4. This light path, together with the FB input of U1, creates a closed loop. The loop balances when the voltage $U_{FB}$ to GND is approximately 0.252 [V].

Reduction of Light

By reducing the photo current in U2 (reduction of light received by U2) the voltage $U_{FB}$ is reduced. This result in a current increase delivered by U1 and thus (over time) a voltage increase across C1 which in turn results in a current increase in D2, D3, D4, R4 and R3. A current increase in D4 (white LED) gives a rise in the light produced and equilibrium is restored. As this results in a current increase in R3 the output voltage increases with the light increase.

Over voltage protection and maximum current

U1 has a built-in over voltage protection circuit, which prevents the voltage across C1 from rising beyond 27.5 [V].

The maximum current that can pass through D4 is thus given by $$I_{D4max}=(U_{OVP}-U_{D2+D3+D4})/(R_3+R_4)=(27.5-(0.7+0.7+4))/(68+270)=65[mA]$$

Maximum Output Voltage

The maximum output voltage is given by the maximum current through R3.

$$U_{o\_max}=I_{D4max}*R3=0.065*68=4.42\ [V]$$

Avoiding closed loop oscillations

If U1 is capable of charging C1 faster than U2 can change the photo current then the feed back voltage ($U_{FB}$) will change too slowly and a $U_{C1}$ overshoot will be the result which in turn gives excess D4 current and thus excess light.

The rise time created by U2 and its load resistor (R2) must be so much smaller than the charging of C1 that the resultant overshoot can be accepted. The actual speed with which C1 is charged by U1 depends on a set of factors which depends on the efficiency of the boost converter formed by U1/L1. Experiments are needed to obtain these data. A good result is achieved for R2=100 k, L1=5.6 uH and C1=10 uF.

LED On Time

When a more opaque media is introduced into the light path the feed-back loop increases the LED current to compensate for the measured light loss. The LED ON time depends on the speed with which the driver can increase the drive voltage (charge the charge capacitor) and thus the LED current. This in turn depends on the maximum drive current and the size of the charge capacitor.

A larger capacitor reduces the ON time at the delivered current and vice versa.

The current being delivered depends on the inductor. A larger inductor increases the current. The driver is limited to handle inductors below 27 uH.

By using over current (70 mA versus 20 mA) the LED On Time is reduced. The total light path must be so efficient that a common bill results in a LED current of 20 [mA] or less. The light path should not permanently be obstructed as this will lead to decreased lifetime.

The higher the LED efficiency is the less current is used to create light and similarly more current is available to charge the charge capacitor.

LED Off Time

The speed with which the light output will be reduced depends on the capacity of C1 given that U1 can switch off in a few microseconds.

The C1 discharge path depends on R3 and R4 assuming that the forward voltages of the diodes are reasonably constant.

$$\tau=R*C=(68+270)*10\ u=3.38\ [ms]$$

This is too slow. A $\tau$ of less than 0.3 [ms] is wanted.

This can be achieved by increasing max current. A higher max current will result in smaller resistors. However a higher max current stresses the LED! This also demands a faster phototransistor/resistor pair as C1 will charge faster.

Modifications may be incorporated without departing from the scope of the present invention.

What is claimed is:

1. An optical detector for measuring opacity of media, the detector comprising:

a light source;

a light sensor;

means defining a media path between the light source and the light sensor;

means for adjusting the light source to maintain a substantially constant output of the light sensor when media of different opacities is transported along the media path, the extent of adjustment of the light source being indicative of a measure of opacity;

optical light guides which form, at least in part, two distinct optical paths which optically couple the light source and the light sensor; and control means for determining degree of skew of a media item based upon the output from the light sensor.

2. A detector as claimed in claim 1, wherein (i) the light sensor receives light via each optical path, and (ii) the output of the light sensor is dependent on whether or not a media item is present in either one optical path or both optical paths.

3. An Automated Teller Machine (ATM), the ATM comprising:

a light source;

a light sensor;

means defining a media transport path between the light source and the light sensor; and means for adjusting the light source to maintain a substantially constant output signal of the light sensor when media of different opacities is transported along the media transport path, the extent of adjustment of the light source being indicative of a measure of opacity of a media item which is being transported along the media transport path;

a first optical light guide defining a first optical path which extends between the light source and the light sensor and which passes through a first portion of the media transport path;

a second optical light guide defining a second optical path which is different from the first optical path and which extends between the light source and the light sensor and which passes through a second portion of the media transport path which is different from the first portion of the media transport path; and control means for determining degree of skew of a media item based upon the output from the light sensor.

4. An ATM as claimed in claim 3, wherein the light source and the light sensor are located on the same side of the transport path.

5. An ATM as claimed in claim 3, wherein the light source is located outside of the media transport path.

6. A method of detecting skew in a bank note which is being transported along a note transport path of a note transport mechanism, the method comprising:

detecting light which is being transmitted along a first optical light path from a light source;

detecting light which is being transmitted along a second optical light path which is different from the first optical light path from the light source; and producing a sensor output signal which varies as a function of the light flux detected along the first optical light path and the light flux detected along the second optical light path;

adjusting the light source to maintain a substantially constant sensor output signal when bank notes of different opacities is transported along the note transport path;

producing a signal which varies as a function of the degree of adjustment of the light source to provide an indication of the opacity of a bank note which is being transported along the note transport path; and control means for determining degree of skew of a media item based upon the output from the light sensor.

7. A method as claimed in claim 6, further comprising detecting double picked bank notes which are being transported along the note transport path.

* * * * *